United States Patent
Chu et al.

(10) Patent No.: US 6,912,178 B2
(45) Date of Patent: Jun. 28, 2005

(54) SYSTEM AND METHOD FOR COMPUTING A LOCATION OF AN ACOUSTIC SOURCE

(75) Inventors: Peter L. Chu, Lexington, MA (US); Michael Kenoyer, Austin, TX (US); Richard Washington, Marble Falls, TX (US)

(73) Assignee: Polycom, Inc., Milpitas, CA (US)

( * ) Notice: Subject to any disclaimer, the term of this patent is extended or adjusted under 35 U.S.C. 154(b) by 0 days.

(21) Appl. No.: 10/414,421

(22) Filed: Apr. 15, 2003

(65) Prior Publication Data

US 2004/0032796 A1 Feb. 19, 2004

Related U.S. Application Data

(60) Provisional application No. 60/372,888, filed on Apr. 15, 2002.

(51) Int. Cl.[7] .............................................. G01S 3/80
(52) U.S. Cl. .................................................... 367/123
(58) Field of Search ............................... 367/125, 129, 367/118, 123

(56) References Cited

U.S. PATENT DOCUMENTS

| 4,688,045 | A | * | 8/1987 | Knudsen | 367/123 |
| 5,465,302 | A |   | 11/1995 | Lazzari et al. | 381/92 |
| 5,778,082 | A |   | 7/1998 | Chu et al. | 381/92 |

OTHER PUBLICATIONS

Harvey F. Silverman et al., "The Huge Microphone Array (HMA)," May 1996 (published at http://www.lems.brown.edu/array/papers/).

Douglas E. Sturim et al., "Tracking Multiple Talkers Using Microphone Array Measurements," (Apr. 1997) (published at http://www.lems.brown.edu/array/papers/).

Michael S. Brandstein et al., "A Robust Method for Speech Signal Time–Delay Estimation in Reverberant Rooms," (Apr. 1997) (published at http://www.lems.brown.edu/array/papers/).

Michael S. Brandstein et al., "A Closed–Form Location Estimator for Use with Room Environment Microphone Arrays," (Jan. 1997) (published at http://www.lems.brown.edu/array/papers/).

Michael S. Brandstein et al., "A Closed–Form Method for Finding Source Locations From Microphone–Array time–Delay Estimates," (Jan. 1997) (published at http://www.lems.brown.edu/array/papers/).

John E. Adcock, "Optimal Filtering And Speech Recognition With Microphone Arrays," Doctotal Thesis, Brown University (May 2001) (published at http://www.lems.brown.edu/array/papers/).

Michael S. Brandstein et al., "Microphone Array Localization Error Estimation with Application to Sensor Placement" (Jun. 1996) (published at http://www.lems.brown.edu/array/papers/).

(Continued)

*Primary Examiner*—Daniel Pihulic
(74) *Attorney, Agent, or Firm*—Wong, Cabello, Lutsch, Rutherford & Brucculeri, LLP

(57) ABSTRACT

In accordance with the present invention, a system and method for computing a location of an acoustic source is disclosed. The method includes steps of processing a plurality of microphone signals in frequency space to search a plurality of candidate acoustic source locations for a maximum normalized signal energy. The method uses phase-delay look-up tables to efficiently determine phase delays for a given frequency bin number k based upon a candidate source location and a microphone location, thereby reducing system memory requirements. Furthermore, the method compares a maximum signal energy for each frequency bin number k with a threshold energy $E_t(k)$ to improve accuracy in locating the acoustic source.

22 Claims, 7 Drawing Sheets

OTHER PUBLICATIONS

J. Adcock et al., "Practical Issues in the Use of a Frequency–Domain Delay Estimator for Microphone–Array Applications" (Nov. 1994) (published at http://www.lems.brown.edu/array/papers/).

M.S. Brandstein et al., "A Practical Time–Delay Estimator for Localizing Speech Sources with a Microphone Array" (Sep. 1995) (published at http://www.lems.brown.edu/array/papers/).

M.S. Brandstein, Abstract of"A Framework for Speech Source Localization Using Sensor Arrays," Doctoral Thesis, Brown University (May 1995) (published at http://www.lems.brown.edu/array/papers/).

Paul C. Meuse et al., "Characterization of Talker Radiation Pattern Using a Microphone–Array" (May 1994) (published at http://www.lems.brown.edu/array/papers/).

M.S. Brandstein et al., "A Localization–Error Based Method for Microphone–Array Design" (May 1996) (published at http://www.lems.brown.edu/array/papers/).

John E. Adcock, "Microphone–Array Speech Recognition via Incremental MAP Training," (May 1996) (published at http://www.lems.brown.edu/array/papers/).

Michael Brandstein & Darren Ward (eds.), "Microphone Arrays: Signal Processing Techniques and Applications," pp. 157–201 (Springer, 2001).

Various materials regarding Aethra's Vega Star Gold product, downloaded from www.if2000.de/daten/ae/vi/vegastar-golden.pdf (Jun. 2003) and www.aethra.com/eng/productsservices/videocommunication/vegastargold.asp.

"Intelligent Working Spaces," Chapter 5 (2002) (downloaded from www.itc.it/abstracts2002/chapter5.pdf).

Various materials regarding Vtel's "SmartTrak" product (1998), downloaded from www.vtel.com/support/catchall/smrtraks.htm; www.vtel.com/support/catchall/smarttra.htm; www.vtel.com/support/catchall/strakgde.htm; and www.vtel.com/support/catchall/strakins.htm.

Information regarding PictureTel's Limelight product (1998), downloaded from www.polycom.com/common/pw_item_show_doc/0,1449,538,00.pdf.

PictureTel's "Concorde 4500 and System 4000EX/ZX Troubleshooting Guide" (1997), downloaded from www.polycom.com/common/pw_item_show_doc/0,1449,444,00.pdf.

PictureTel's "Concorde 4500 Software Version 6.11 Release Bulletin" (1996), downloaded from www.polycom.com/common/pw_item_show_doc/0,1449,438,00.pdf.

PictureTel's "Venue2000 User's Notebook" (1999), downloaded from www.polycom.com/common/pw_item_show_doc/0,1449,675,00.pdf.

Information regarding PictureTel's 760XL Videoconferencing System (2000), downloaded from www.polycom.com/common/pw_item_show_doc/0,1449,427,00.pdf.

* cited by examiner

SYSTEM AND METHOD FOR COMPUTING A LOCATION OF AN ACOUSTIC SOURCE

CROSS REFERENCE TO RELATED APPLICATION

This application claims the benefit of Provisional Patent Application Ser. No. 60/372,888, filed Apr. 15, 2002, entitled "Videoconferencing System with Horizontal and Vertical Microphone Arrays for Enhanced Source Locating and Camera Tracking," which is incorporated herein by reference. This application is related to U.S. application Ser. No. 10/414,420 entitled "Videoconferencing System with Horizontal and Vertical Microphone Arrays", by Peter Chu, Michael Kenoyer, and Richard Washington, filed concurrently herewith, which is incorporated herein by reference.

BACKGROUND OF THE INVENTION

1. Field of the Invention

This invention relates generally to signal processing and more particularly to a method for computing a location of an acoustic source.

2. Description of the Background Art

Spatial localization of people talking in a room is important in many applications, such as surveillance and videoconferencing applications. In a videoconferencing application, a camera uses spatial localization data to track an acoustic source. Typically, a videoconferencing system localizes the acoustic source by applying cross correlation techniques to signals detected by a pair of microphones. The cross correlation techniques involve finding the crosscorrelation between the time domain signals of a pair of microphones. The shift in time which corresponds to the peak of the cross correlation corresponds to the difference in time of arrival of the acoustic source to the two microphones. Knowledge of the difference in time of arrival infers that the source is located in a geometric plane in space. By using three pairs of microphones, one can locate the source by finding the intersection of the three planes.

However, the 2-microphone cross correlation techniques of the prior art provide slow, inaccurate, and unreliable spatial localization of acoustic sources, particularly acoustic sources located in noisy, reverberant environments. A primary reason for the poor performance of the two-microphone cross correlation techniques for estimating an acoustic source location is poor sidelobe attenuation of a directional pattern formed by delaying and summing the two microphone signals. For example, an acoustic source located in a reverberant environment, such as a room, generates acoustic signals which are reflected from walls and furniture. Reflected signals interfere with the acoustic signals that are directly propagated from the acoustic source to the microphones. For a 2-microphone array, the direct and reflected acoustic signals received by the microphones may increase sidelobe magnitude of the 2-microphone directional pattern, and may produce an erroneous acoustic source location. The poor sidelobe attenuation of the 2-microphone directional pattern is further discussed below in conjunction with FIG. 2C.

It would be advantageous to designers of surveillance and videoconferencing applications to implement an efficient and accurate method for spatial localization of acoustic sources, particularly acoustic sources located in noisy and reverberant environments.

SUMMARY OF THE INVENTION

In accordance with the present invention, a system and method for computing a location of an acoustic source is disclosed. In one embodiment of the invention, the present system includes a plurality of microphones for receiving acoustic signals generated by the acoustic source, at least one A/D converter for digitizing the acoustic signals received by the plurality of microphones, a data segmenter for segmenting each digitized signal into a plurality of blocks, an overlap-add filter bank for generating a plurality of transformed blocks by performing a Fast Fourier Transform (FFT) on each block, a memory configured to store phase-delay look-up tables, and a processor for computing the location of the acoustic source by processing the transformed blocks of each acoustic signal received by each microphone according to candidate source locations using the phase-delay look-up tables.

In one embodiment of the invention, the method for computing the location of the acoustic source includes receiving a plurality of M analog signals from a plurality of M microphones, digitizing each received analog signal, segmenting each digitized signal into a plurality of blocks, performing a discrete Fast Fourier Transform (FFT) on each block to generate N complex coefficients $F^p_m(k)$ per block, searching P blocks of each digitized signal for a maximum signal energy and identifying a block p' containing the maximum signal energy for each frequency bin number k, comparing the maximum signal energy with a threshold energy $E_t(k)$ and setting the complex coefficients in the P blocks of each digitized signal equal to zero when the maximum signal energy is less than the threshold energy for each frequency bin number k, determining phase delays using three look-up tables, multiplying each complex coefficient by an appropriate phase delay and summing the phase-delayed complex coefficients over the M microphones for each candidate source location and for each frequency bin number k, computing a normalized total signal energy for each candidate source location, and finally determining the location of the acoustic source based upon the normalized total signal energy for each candidate source location.

DETAILED DESCRIPTION OF THE DRAWINGS

Figure 1A:
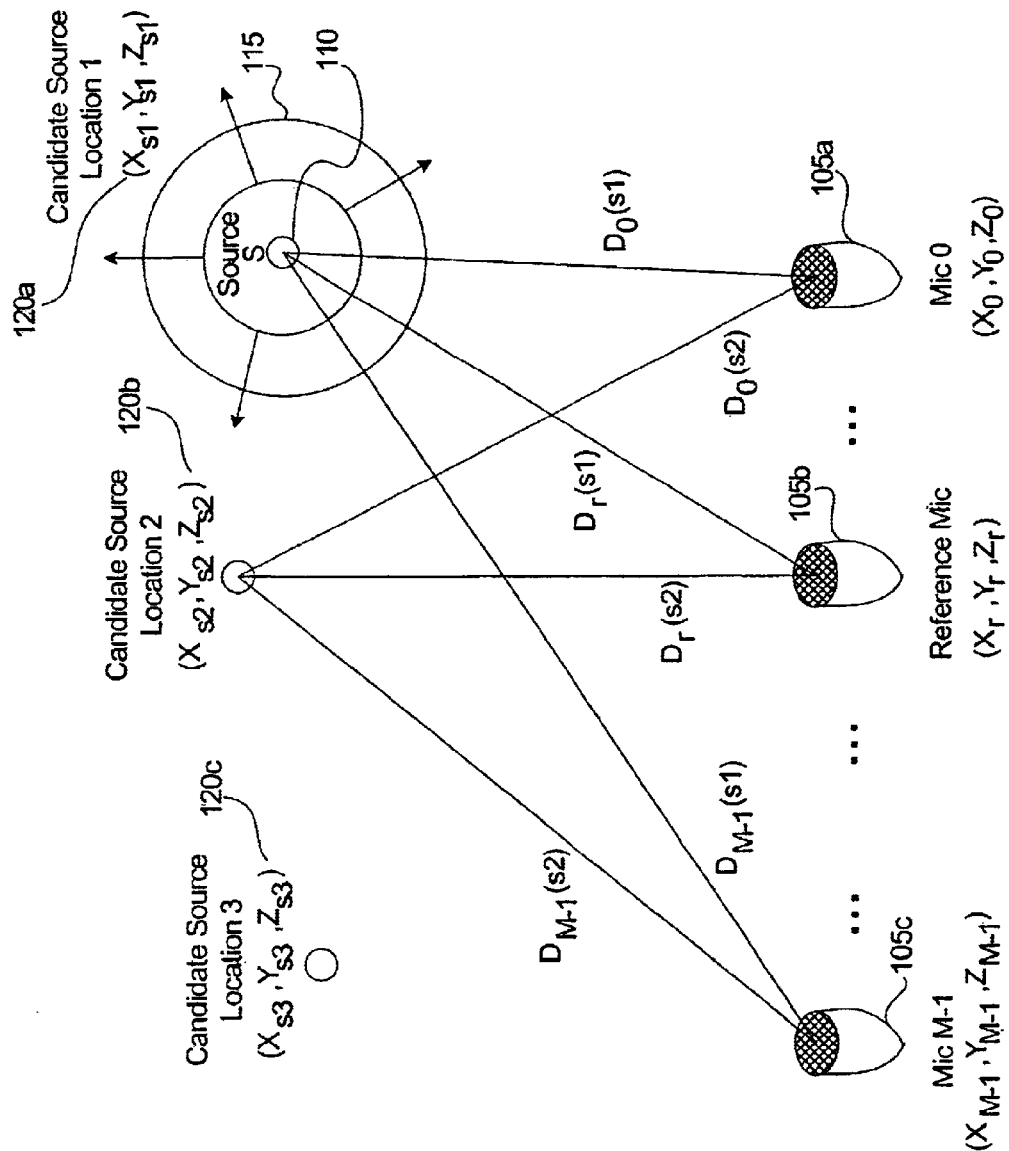
FIG. 1A is a diagram illustrating nomenclature and elements of an exemplary microphone/source configuration, according to one embodiment of the present invention.

FIG. 1A is a diagram illustrating nomenclature and elements of an exemplary microphone/source configuration, according to one embodiment of the present invention. Elements of FIG. 1A include a plurality of microphones 105a–c (also referred to as a microphone array) configured to receive acoustic signals from a source S 110, a candidate source location 1 ($X_{s1}$, $Y_{s1}$, $Z_{s1}$) 120a, a candidate source location 2 ($X_{s2}$, $Y_{s2}$, $Z_{s2}$) 120b, and a candidate source location 3 ($X_{s3}$, $Y_{s3}$, $Z_{s3}$) 120c. An integer microphone index m is used to label each microphone, where $0 \leq m \leq M-1$, M is a total number of microphones, and M is any integer greater than 1. For ease of illustration, the FIG. 1A embodiment shows three microphones 105a–c (i.e., M=3), although the present invention typically uses a larger number of microphones (i.e., M>3). The plurality of microphones 105a–c include a microphone 0 105a located at ($X_0$, $Y_0$, $Z_0$), a reference microphone 105b located at ($X_r$, $Y_r$, $Z_r$), and a microphone M-1 105c located at ($X_{M-1}$, $Y_{M-1}$, $Z_{M-1}$). According to the present invention, one microphone of the plurality of microphones 105a–c is designated as the reference microphone 105b, where any one of the plurality of microphones 105a–c may be designated as a reference microphone.

The source S 110 is any acoustic source for generating acoustic signals. For example, the source S 110 may be a person, an electrical apparatus, or a mechanical apparatus for generating acoustic signals. The acoustic signals generated by the source S 110 propagate away from the source S 110. Concentric circles 115 centered about the source S 110 are projections of spherical wave fronts generated by the source S 110 onto a two-dimensional plane of FIG. 1.

For the purposes of the following discussion, the source S 110 is located at the candidate source location 1 ($X_{s1}$, $Y_{s1}$, $Z_{s1}$) 120a. However, the scope of the present invention covers the source S 110 located at any one of the plurality of candidate source locations 120a–c, or at a location that does not coincide with any of the plurality of candidate source locations 120a–c.

The present invention computes a total signal energy received from each of the plurality of candidate source locations 120a–c by appropriately delaying the microphone signals with respect to a signal received by the reference microphone 105b, and then summing the delayed signals. The present invention may be implemented as application software, hardware, or application software/hardware (firmware). Although FIG. 1A illustrates three candidate source locations (120a, 120b, 120c), the present invention includes any number of candidate source locations. In addition, although a location of the source S 110 may or may not correspond to one of the candidate source locations 120a–c, the present invention estimates the location of the source S 110 at one of the plurality of candidate source locations 120a–c, based upon the total signal energy computed for each candidate source location.

FIG. 1A also shows distances measured from each microphone 105a–c to the candidate source locations 120a and 120b. For example, $D_0(s1)$ is a distance between the microphone 0 105a and the candidate source location 1 120a, $D_0(s2)$ is a distance between the microphone 0 105a and the candidate source location 2 120b, $D_r(s1)$ is a distance between the reference microphone 105b and the candidate source location 1 120a, $D_r(s2)$ is a distance between the reference microphone 105b and the candidate source location 2 120b, $D_{M-1}(s1)$ is a distance between the microphone 105c and the candidate source location 1 120a, and $D_{M-1}(s2)$ is a distance between the microphone 105c and the candidate source location 2 120b. Although FIG. 1A shows the microphones 105a–c, the candidate source locations 120a–c, and the source S 110 constrained to lie in the two-dimensional plane of FIG. 1A, the scope of the present invention covers any two-dimensional or three-dimensional configuration of the microphones 105a–c, the candidate source locations 120a–c, and the source S 110.

Figure 1B:
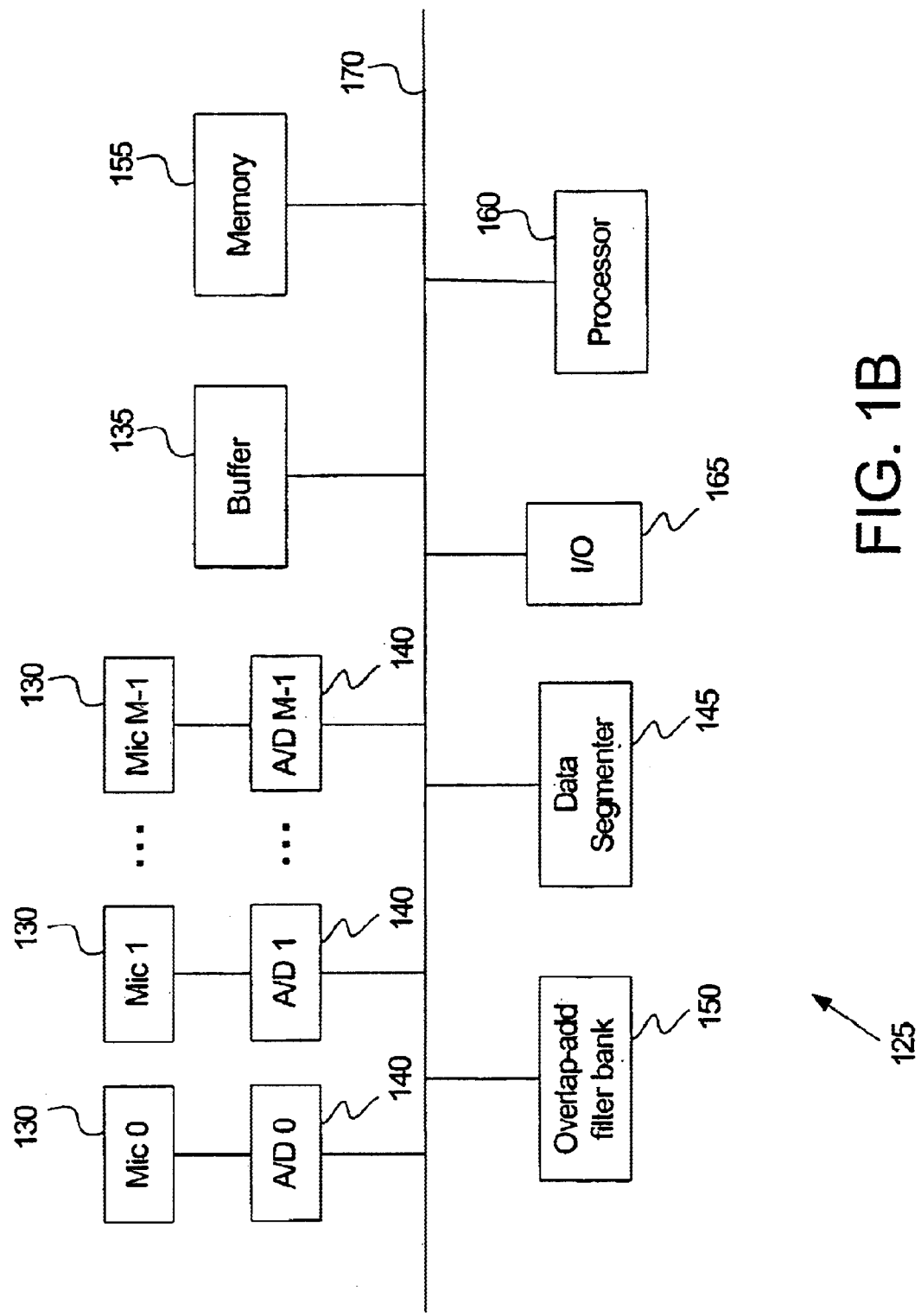
FIG. 1B is an exemplary block diagram of a system for locating an acoustic source, according to one embodiment of the present invention.

FIG. 1B is an exemplary block diagram of a system 125 for locating an acoustic source, such as the acoustic source S 110 (FIG. 1A), according to one embodiment of the present invention. Elements of the system 125 include M microphones 130 for receiving M acoustic signals generated by the acoustic source S 110, at least one analog/digital (A/D) converter 140 for converting the M received acoustic signals to M digital signals, a buffer 135 for storing the M digital signals, a data segmenter 145 for segmenting each digital signal into blocks of data, an overlap-add filter bank 150 for performing a Fast Fourier Transform (FFT) on each block of data for each digital signal, a memory 155 for storing acoustic source location software, look-up tables, candidate source locations, and initialization parameters/constants associated with determining the acoustic source location, a processor 160 for executing the acoustic source location software and for signal processing, an input/output (I/O) port 165 for receiving/sending data from/to external devices (not shown), and a bus 170 for electrically coupling the elements of the system 125.

According to the present invention, one method of locating the source S 110 is using a maximum likelihood estimate. Using the maximum likelihood estimate, the source S 110 is hypothesized to be located at a plurality of possible candidate locations, such as the candidate source locations 120a, 120b, and 120c (FIG. 1A). The maximum likelihood estimate may be implemented with the acoustic source location software stored in the memory 155 and executed by the processor 160, or acoustic source location firmware. In one embodiment of the method for computing an acoustic source location, the analog-to-digital (A/D) converter 140 digitizes each signal received by each microphone 130. Then, the data segmenter 145 segments each digitized signal into blocks of data. Next, the overlap-add filter bank 150 performs a discrete Fast Fourier Transform (FFT) on each block of data. For example, if each signal received by each microphone 130 is digitized and segmented into blocks of data, where each block of data includes N=640 digitized time samples, then each block of data sampled in time is mapped to a block of data sampled in frequency, where each data sampled in frequency is a complex number (also called a complex coefficient), and each block of data sampled in frequency includes N=640 discrete frequency samples. Each complex coefficient is associated with a frequency bin number k, where $0 \leq k \leq N-1$ and k is an integer.

Then, for each candidate source location 120a–c and for each frequency bin number k, each complex coefficient associated with each microphone's signal is multiplied by an appropriate phase delay, the complex coefficients are summed over all the microphone signals, and a signal energy is computed. A whitening filter is then used to normalize the signal energy for each frequency bin number k, and the normalized signal energies are summed over the N frequency bin numbers for each candidate source location 120a–c to give a total signal energy for each candidate source location 120a–c. The method then determines the candidate source location 120a–c associated with a maximum total signal energy and assigns this candidate source location as an estimated location of the source S 110. A computationally efficient method of implementing the maximum likelihood estimate for estimating an acoustic source location will be discussed further below in conjunction with FIGS. 3A–3B.

Figure 2A:
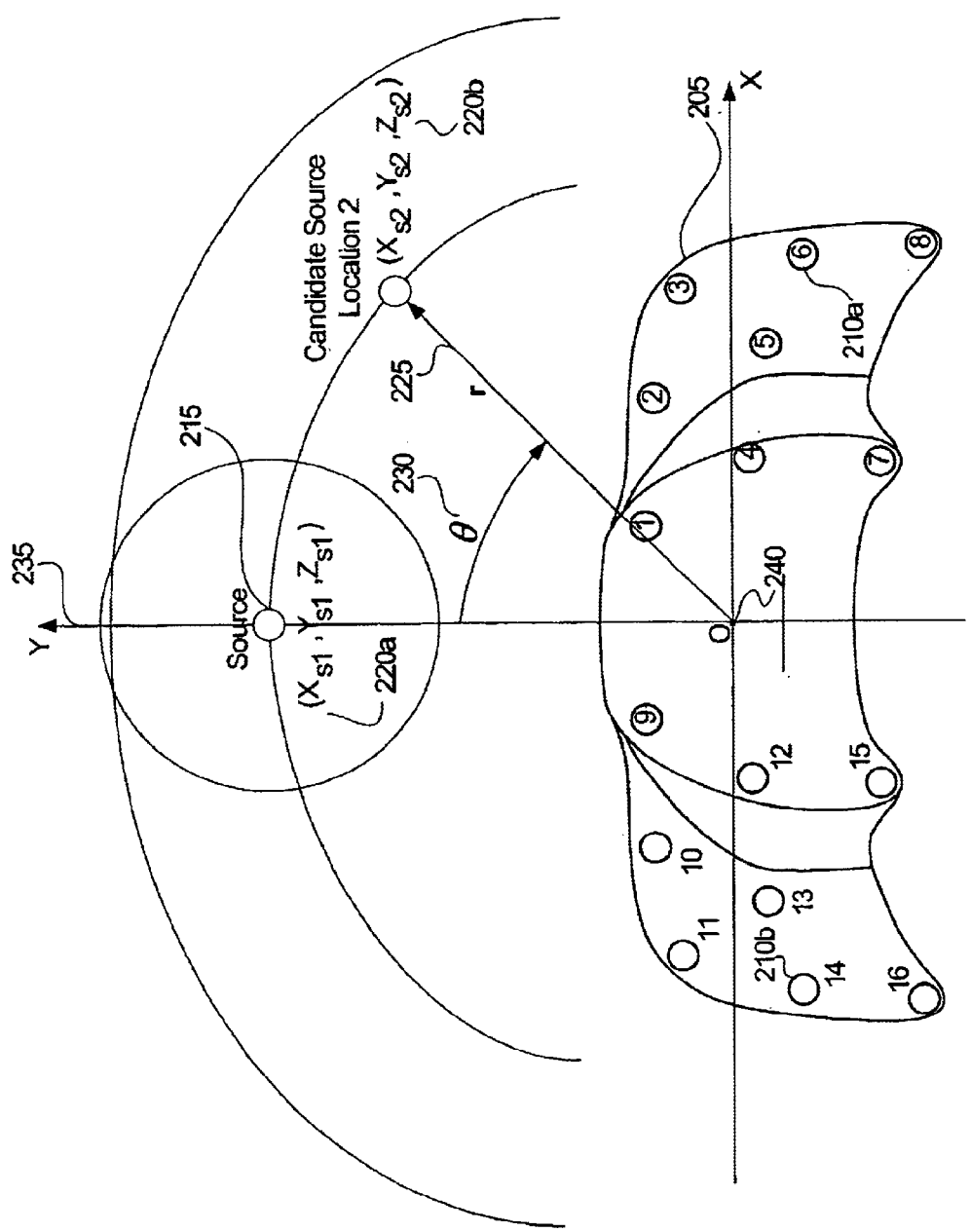
FIG. 2A is an exemplary embodiment a 16-microphone array, according to the present invention.

FIG. 2A illustrates one embodiment of a 16-microphone array 205 for receiving acoustic signals to be processed by acoustic source location software or firmware, according to the present invention. The 16-microphone array 205 includes an arrangement of 16 microphones labeled 1–16 configured to receive acoustic signals from an acoustic source 215. In the present embodiment, a distance between a microphone 6 210*a* and a microphone 14 210*b* is 21.5 inches. Thus, the 16-microphone array 205 spans 21.5 inches. The acoustic source 215 is located at a candidate source location 1 ($X_{s1}, Y_{s1}, Z_{s1}$) 220*a*. The acoustic source location software or firmware processes the signals received by the 16 microphones according to candidate source locations. For simplicity of illustration, the FIG. 2A embodiment shows only candidate source locations 220*a* and 220*b*, but the scope of the present invention includes any number of candidate source locations. Although FIG. 2A illustrates a specific spatial distribution of the 16 microphones as embodied in the 16-microphone array 205, the present invention covers any number of microphones distributed in any two-dimensional or three-dimensional spatial configuration. In the FIG. 2A embodiment of the present invention, each candidate source location may be expressed in polar coordinates. For example, the candidate source location 2 220*b* has polar coordinates (r,θ), where r is a magnitude of a vector r 225 and θ 230 is an angle subtended by the vector r 225 and a positive y-axis 235. The vector r 225 is a vector drawn from an origin O 240 of the 16-microphone array 205 to the candidate source location 2 220*b*, but the vector r 225 may be drawn to the candidate source location 1 220*a*, or to any candidate source location of a plurality of candidate source locations (not shown).

Figure 2B:
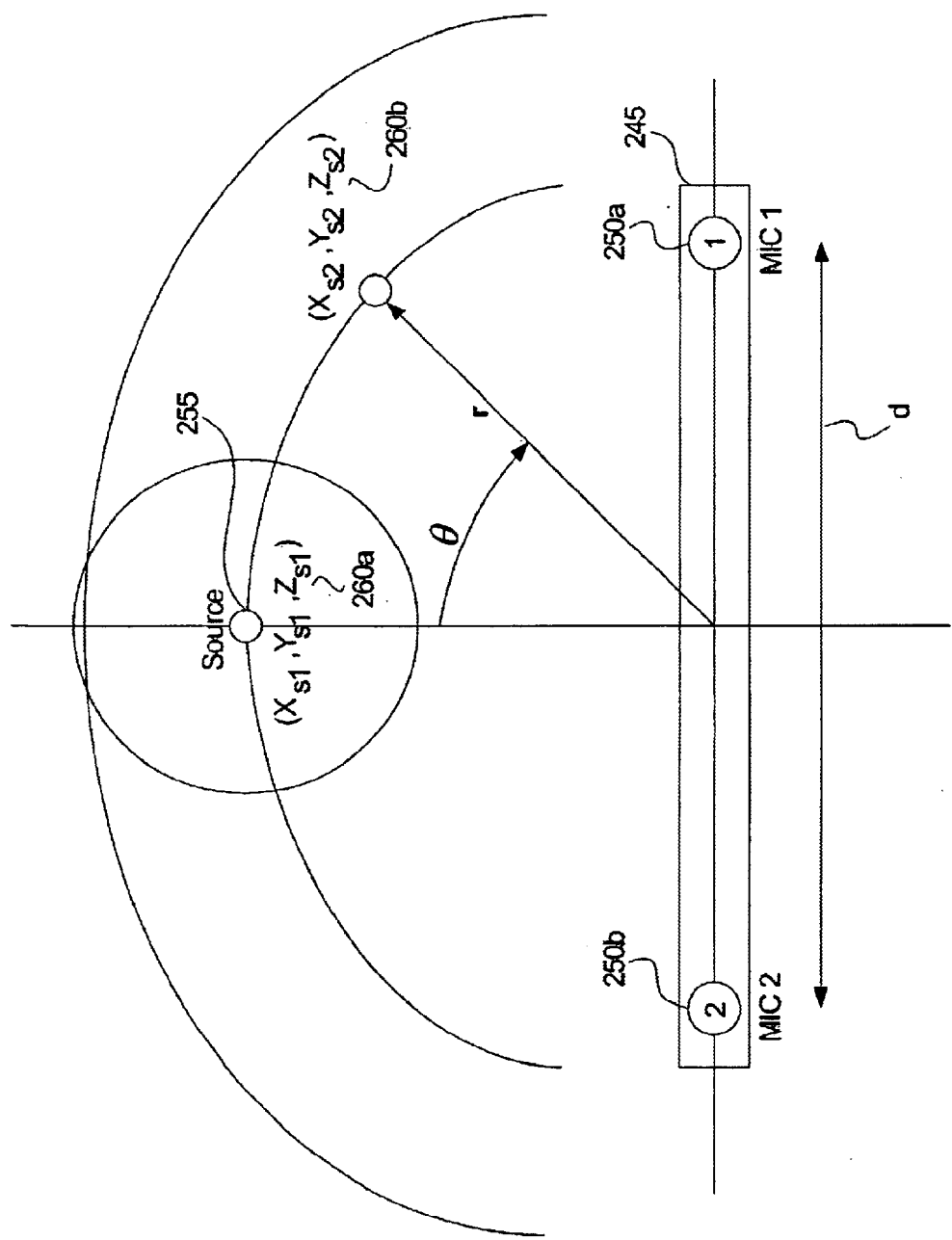
FIG. 2B is an exemplary embodiment of a 2-microphone array, according to the present invention.

FIG. 2B is one embodiment of a 2-microphone array 245 for receiving acoustic signals to be processed by acoustic source location software or firmware, according to the present invention. The microphone array 245 includes a microphone 1 250*a* and a microphone 2 250*b* separated by a distance d, an acoustic source 255 located at a candidate source location 1 ($X_{s1}, Y_{s1}, Z_{s1}$) 260*a*, and a candidate source location 2 ($X_{s2}, Y_{s2}, Z_{s2}$) 260*b*. Although the FIG. 2B embodiment of the present invention illustrates two candidate source locations (260*a* and 260*b*), the present invention covers any number of candidate source locations. In one embodiment of the present invention d=21.5 inches, although in other embodiments of the invention the microphone 1 250*a* and the microphone 2 250*b* may be separated by any distance d.

Figure 2C:
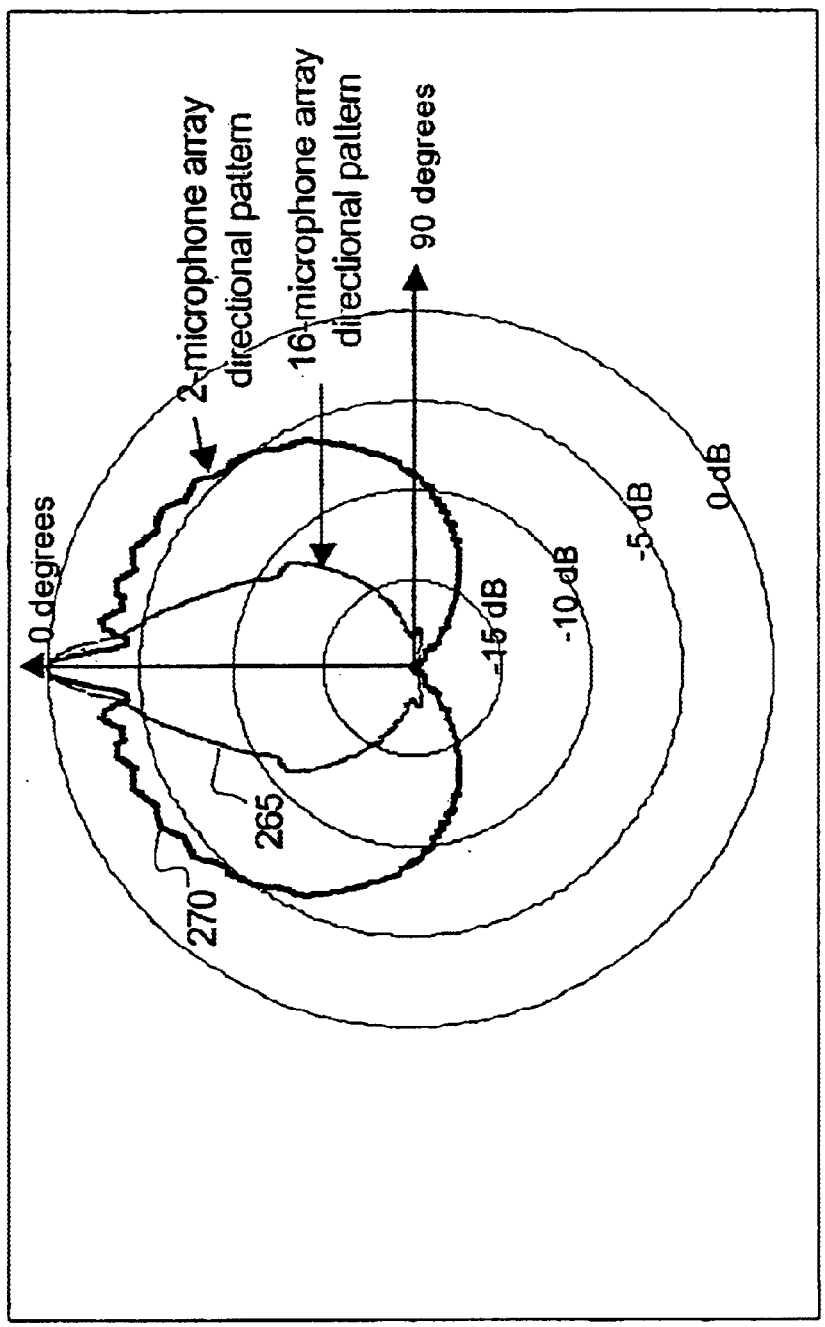
FIG. 2C is an exemplary polar plot of a total signal energy received by the 16-microphone array of FIG. 2A and a total signal energy received by the 2-microphone array of FIG. 2B.

FIG. 2C shows a 16-microphone array polar plot of total signal energy computed by acoustic source location software (i.e., application software), or firmware upon receiving acoustic signals from the acoustic source 215 (FIG. 2A) and the 16-microphone array 205 (FIG. 2A), and a 2-microphone array polar plot of total signal energy computed by the application software or firmware upon receiving acoustic signals from the acoustic source 255 (FIG. 2B) and the 2-microphone array 245 (FIG. 2B). The polar plots are also referred to as directional patterns. As illustrated in FIG. 2A and FIG. 2B, the source 215 is located at θ=0 degrees and the source 255 is located at θ=0 degrees, respectively. In generating the FIG. 2C embodiments of the 16-microphone array polar plot and the 2-microphone array polar plot, the source 215 and the source 255 are identical white noise sources spanning a frequency range of 250 Hz to 5 kHz. FIG. 2C illustrates that a magnitude of a sidelobe 265 of the 16-microphone array directional pattern is smaller than a magnitude of a sidelobe 270 of the 2-microphone array directional pattern, where sidelobe magnitude is measured in decibels (dB).

Spurious acoustic signals may be generated by reflections of acoustic source signals from walls and furnishings of a room. These spurious signals may interfere with the 2-microphone array directional pattern and the 16-microphone array directional pattern computed by the application software as illustrated in FIG. 2C. However, since the sidelobe 270 of the 2-microphone array directional pattern is greater in magnitude than the sidelobe 265 of the 16-microphone array directional pattern, the spurious signals may cause a greater uncertainty in an estimated location of the acoustic source 255 using the 2-microphone array 245. For example, the spurious signals may increase the magnitude of the sidelobe 270 of the 2-microphone array directional pattern to zero dB, thus generating an uncertainty in the estimated location of the acoustic source 255. More specifically, poor sidelobe attenuation of the 2-microphone array directional pattern may allow spurious signals to interfere with accurately estimating an acoustic source location. Thus, application software or firmware for processing acoustic signals received by the 16-microphone array 205 is the preferred embodiment of the present invention, however, the scope of the present invention covers application software or firmware for processing acoustic signals received by microphone arrays having any number of microphones distributed in any two-dimensional or three-dimensional configuration.

Since the scope of the present invention includes processing acoustic signals received by a plurality of microphones to search thousands of candidate source locations, a straightforward implementation of the maximum likelihood estimate method is computationally intense. Accordingly, the present invention uses a plurality of microphones and a computationally efficient implementation of the maximum likelihood estimate method to compute a location of an acoustic source in an accurate manner.

Figure 3A:
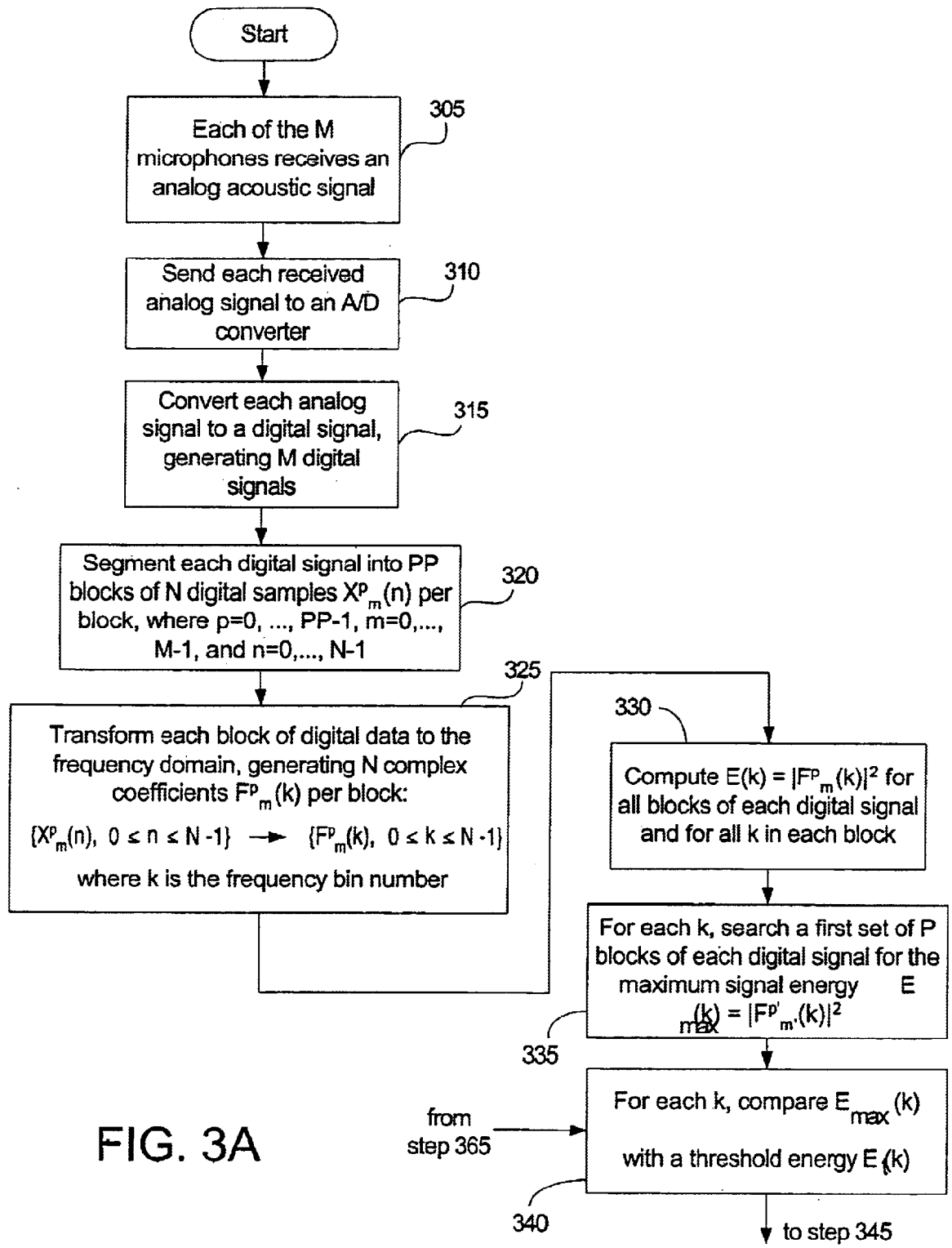
FIG. 3A is flowchart of exemplary method steps for estimating an acoustic source location, according to the present invention.

FIG. 3A is flowchart of exemplary method steps for estimating an acoustic source location, according to the present invention. In step 305, each of the M microphones (FIG. 1A, FIG. 1B, FIG. 2A, or FIG. 2B) receives an analog acoustic signal $x_m(t)$, where m is an integer microphone index which identifies each of the microphones, and $0 \leq m \leq M-1$. In step 310, each microphone sends each received analog signal to an associated A/D converter 140 (FIG. 1B). For example, in one embodiment of the invention, each analog signal received by the microphone 130 (FIG. 1B) is sent to each analog signal's associated A/D converter 140 so that in step 315 each associated A/D converter 140 converts each analog signal to a digital signal, generating M digital signals. For example, in one embodiment of the invention, each associated A/D converter 140 samples each analog signal at a sampling rate of $f_s$=32 kHz. The M digital signals are stored in the buffer 135 (FIG. 1B).

In step 320, a data segmenter 145 (FIG. 1B) segments each digital signal into PP blocks of N digital samples $X^p_m(n)$ per block, where PP is an integer, p is an integer block index which identifies a block number ($0 \leq p \leq PP-1$), n is an integer sample index which identifies a sample number ($0 \leq n \leq N-1$), and m is the integer microphone index which identifies a microphone ($0 \leq m \leq M-1$). In one embodiment of the invention, each block is of time length T=0.02 s, and each block comprises N=640 digital samples. However, the scope of the invention includes any time length T, any sampling rate $f_s$, and any number of samples per block N.

In step 325, an overlap-add filter bank 150 (FIG. 1B) performs a discrete Fast Fourier Transform (FFT) on each block of digital samples, (also referred to as digital data), to generate N complex coefficients per block, where each complex coefficient is a function of a discrete frequency identified by a frequency bin number k. More specifically, a set of N digital samples per block is mapped to a set of N complex coefficients per block: $\{X^{p}{}_{m}(n), 0 \leq n \leq N-1\} \rightarrow \{F^{p}{}_{m}(k), 0 \leq k \leq N-1\}$. The N complex coefficients $F^{p}{}_{m}(k)$ are complex numbers with real and imaginary components.

In step 330, the method computes a signal energy $E(k) = |F^{p}{}_{m}(k)|^{2}$ for each complex coefficient ($0 \leq p \leq PP-1$ and $0 \leq m \leq M-1$) for each frequency bin number k. More specifically, the method computes M×PP signal energies for each frequency bin number k. In this step and all subsequent steps of the FIG. 3A-3B embodiment of the present invention, methods for performing various functions and/or signal processing are described. In an exemplary embodiment of steps 330–385, the methods described are performed by the processor 160 (FIG. 1B) executing acoustic source location software, and in other embodiments, the methods described are performed by a combination of software and hardware.

In step 335, the method searches, for each frequency bin number k, the signal energies of a first set of P blocks of each digital signal for a maximum signal energy $E_{max}(k) = |F^{p'}{}_{m'}(k)|^{2}$, where p' specifies a block associated with the maximum signal energy and m specifies a microphone associated with the maximum signal energy. In one embodiment of the invention, P=5.

Next, in step 340, the method compares each $E_{max}(k)$ with a threshold energy $E_t(k)$. In one embodiment of the invention, the threshold energy $E_t(k)$ for each frequency bin number k is a function of background noise energy for the frequency bin number k. For example, the threshold energy $E_t(k)$ may be predefined for each frequency bin number k and stored in the memory 155 (FIG. 1B), or the method may compute the threshold energy $E_t(k)$ for each frequency bin number k using the M microphone signals to compute background noise energy during periods of silence. A period of silence may occur when conference participants are not speaking to the M microphones, for example.

Figure 3B:
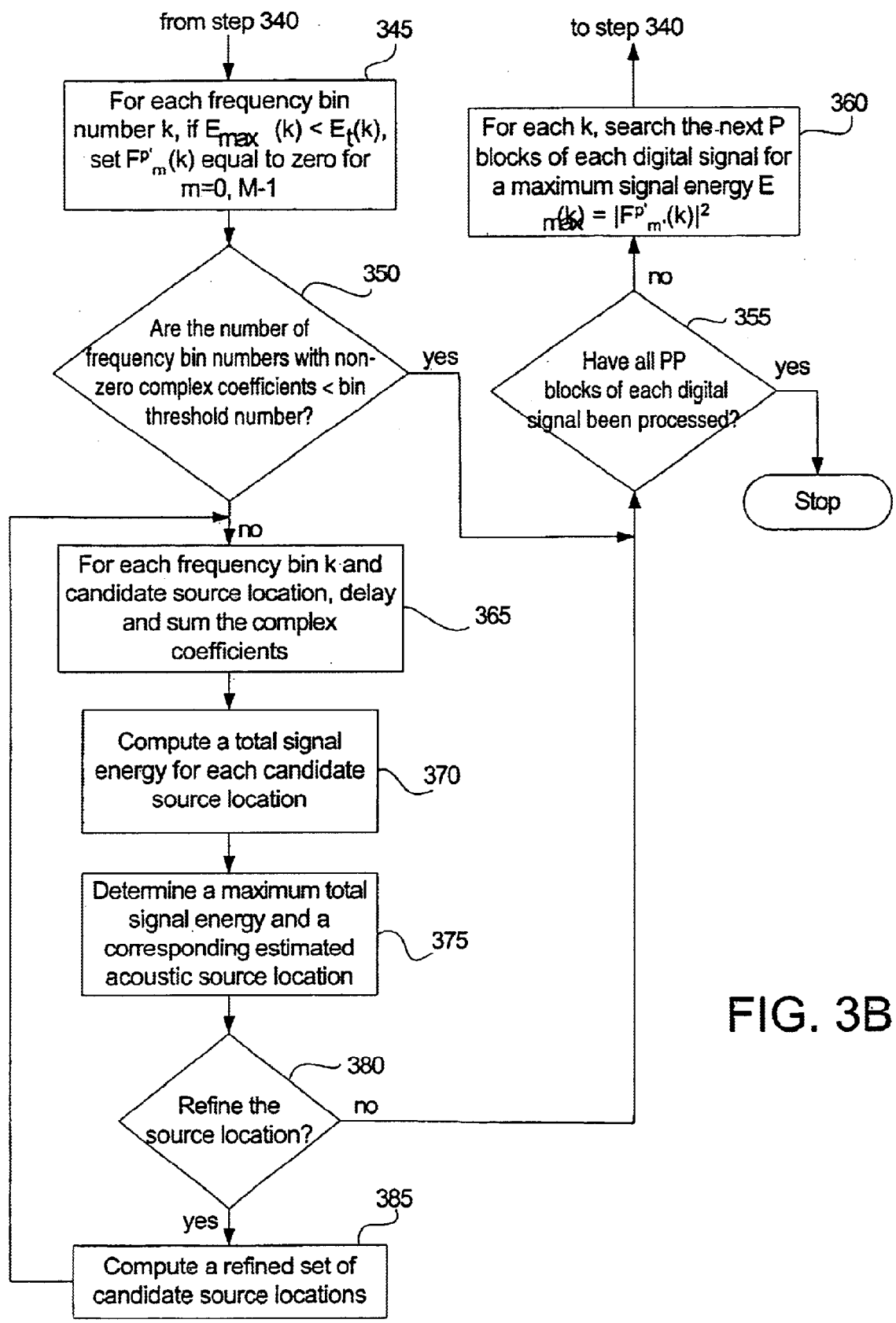
FIG. 3B is a continuation of the FIG. 3A flowchart of exemplary method steps for estimating the acoustic source location, according to the present invention.

FIG. 3B is a continuation of the FIG. 3A flowchart of exemplary method steps for estimating an acoustic source location, according to the present invention. In step 345, if $E_{max}(k) < E_t(k)$ for a given k, then the complex coefficients are set equal to zero for all values of m for the block p'. That is, if $E_{max}(k) < E_t(k)$, then $F^{p'}{}_{m}(k) = 0$ for $0 \leq m \leq M-1$. The complex coefficients for a given frequency bin number k are set equal to zero when a maximum signal energy associated with those complex coefficients is below a threshold energy. If these complex coefficients are not set equal to zero, then the method may compute an inaccurate acoustic source location due to excessive noise in the acoustic signals. However, as will be seen further below in conjunction with step 365, if these complex coefficients are set equal to zero, excessive signal noise associated with frequency bin number k is eliminated in the computation of an acoustic source location.

In step 350, the method determines if the number of frequency bin numbers with non-zero complex coefficients is less than a bin threshold number. The bin threshold number may be a predefined number stored in the memory 155 (FIG. 1B). The bin threshold number is defined as a minimum number of frequency bin numbers with non-zero complex coefficients that the method requires to compute an acoustic source location. If, in step 350, the method determines that the number of frequency bin numbers with non-zero complex coefficients is less than the bin threshold number, then the total signal strength is too weak to accurately compute an acoustic source location, steps 365–385 are bypassed, and in step 355, the method determines if all PP blocks of each digital signal have been processed. If, in step 355, the method determines that all PP blocks of each digital signal have been processed, then the method ends. If, in step 355, the method determines that all PP blocks of each digital signal have not been processed, then in step 360, the method searches, for each frequency bin number k, a next set of P blocks of each digital signal for a maximum signal energy $E_{max}(k) = |F^{p'}{}_{m'}(k)|^{2}$. Then, steps 340–350 are repeated.

If, in step 350, the method determines that the number of frequency bin numbers with non-zero complex coefficients is greater than or equal to the bin threshold number, then in step 365, the complex coefficients are phase-delayed and summed over the microphone index m for each frequency bin number k and each candidate source location. Each phase delay $\theta_m$ is a function of the frequency bin number k, a candidate source location, and a microphone location (as represented by the microphone index m) with respect to a reference microphone location. For example, for a given frequency bin number k and a candidate source location (x,y,z), a summation over the index m of the phase-delayed complex coefficients is $$G_{x,y,z}(k) = \sum_{m=0}^{M-1} e^{j\theta_m}$$

$F^{p'}{}_{m}(k)$, where the complex coefficients $F^{p'}{}_{m}(k)$ from block p' are phase-delayed and summed, and where p' is the block associated with the maximum signal energy for the given frequency bin number k.

A phase delay between a microphone m (i.e., a microphone corresponding to the microphone index m), and a reference microphone, such as the reference microphone 105b (FIG. 1A), is $\theta_m = 2\pi k b \Delta_m v$, where b is a width of each frequency bin number k in Hertz, v is a constant that is proportional to a reciprocal of the speed of sound (i.e., an acoustic signal speed), and $\Delta_m$ is a difference in distance between a location $(X_m, Y_m, Z_m)$ of the microphone m and a candidate source location (x,y,z), and a location $(X_r, Y_r, Z_r)$ of the reference microphone and the candidate source location (x,y,z). For example, $\Delta_m = D_m - D_r$, where $D_m = ((x-X_m)^2 + (y-Y_m)^2 + (z-Z_m)^2)^{1/2}$ is the distance between the candidate source location (x,y,z) and the location $(X_m, Y_m, Z_m)$ of the microphone m, and $D_r = ((x-X_r)^2 + (y-Y_r)^2 + (z-Z_r)^2)^{1/2}$ is the distance between the candidate source location (x,y,z) and the location $(X_r, Y_r, Z_r)$ of the reference microphone. Space surrounding a microphone array, such as the 16-microphone array 205 (FIG. 2A), may be divided up into a plurality of coarsely or finely separated candidate source locations. For example, in one embodiment of the invention, the candidate source locations may be located along a circle with the microphone array placed at the center of the circle. In this embodiment, a radius of the circle is 10 feet, and 61 candidate source locations are place at three degree increments along the circle, spanning an angle of 180 degrees. Then, for each k and for each candidate source location, the method computes a sum over the index m of the phase-delayed complex coefficients.

In step 370, the method computes a total signal energy for each candidate source location. The total signal energy is $$W(x, y, z) = \sum_{k} [|G_{x,y,z}(k)|^2 / |S(k)|^2],$$

where a total energy $|G_{x,y,z}(k)|^2$ received by the M microphones in the frequency bin number k from the candidate source location (x,y,z) is normalized by a whitening term $|S(k)|^2$. The whitening term is an approximate measure of the signal strength in frequency bin number k. In one embodiment of the present invention, the method computes $|S(k)|^2$ by averaging the signal energy of all the microphone signals for a given k, where $$|S(k)|^2 = \sum_{m} |F_m^{p'}(k)|^2.$$

Normalization of the total energy $|G_{x,y,z}(k)|^2$ of frequency bin number k by the whitening term $|S(k)|^2$ allows all frequency components of an acoustic source to contribute to the computation of a location of the acoustic source.

Typically, the total signal energy W(x,y,z) is computed by a summation over k, where k=0, . . . , N-1. However, the scope of the present invention also includes a trimmed frequency summation, where k is summed from a low frequency bin number ($k_{low}$>0) to a high frequency bin number ($k_{high}$<N-1). By ignoring the very low and the very high frequency components in the summation of the total signal energy, cost to compute a location of the acoustic source is reduced.

In step 375, the method determines a maximum total signal energy, and thus a candidate source location associated with the maximum total signal energy. The candidate source location associated with the maximum total signal energy is identified as an estimated location of the acoustic source.

In step 380, if the location of the acoustic source is to be refined, then in step 385, the method computes a refined set of candidate source locations. For example, in one embodiment of the invention, the computed refined set of candidate source locations are centered about the acoustic source location computed in step 375. In another embodiment of the invention, the method uses a refined set of candidate source locations stored in the memory 155. For example, the stored refined set of candidate source locations may be located along six concentric rings in a quarter of a degree increments along each ring, where each concentric ring has a unique radius and each concentric ring spans 180 degrees. In this embodiment of the invention, there are 4326 refined candidate source locations. As discussed further below in conjunction with a more detailed description of step 365, the stored refined candidate source locations may be incorporated in look-up tables stored in the memory 155.

Next, steps 365–380 are repeated, and a refined acoustic source location is computed. However, if in step 380, a refinement to the acoustic source location is not desired, then in step 355, the method determines if all PP blocks of each digital signal have been processed. If all PP blocks of each digital signal have been processed, then the method ends. If, in step 355, all PP blocks of each digital signal have not been processed, then in step 360 the method searches, for each frequency bin number k, the next set of P blocks of each digital signal for a maximum signal energy $E_{max}(k) = |F_{m'}^{p'}(k)|^2$, and the method continues at step 340.

Referring back to step 365, the method phase-delays each complex coefficient by multiplying each complex coefficient with a transcendental function $e^{i\theta}{}_m = \cos(\theta_m) + i \cdot \sin(\theta_m)$. It is costly and inefficient to compute the transcendental function at run-time. It is more efficient to pre-compute values of the transcendental function ($\cos(\theta_m)$ and $\sin(\theta_m)$) before run-time, and store the values in look-up tables (not shown) in the memory 155 (FIG. 1B). However, since in one embodiment of the invention a number of candidate source locations is 4326, a number of frequency bin numbers is 640, and a number of microphone signals is M=16, and since $\theta_m$ is a function of a candidate source location, a location of a microphone m, and a frequency bin number k, the look-up tables for $\cos(\theta_m)$ and $\sin(\theta_m)$ include 2·4326·640·16=88,596,480 entries. Using a processor with 16 bit precision per entry and eight bits per byte requires approximately 177 M bytes of memory to store the look-up tables.

To reduce memory requirements of the look-up tables and decrease cost of system hardware, alternate (phase delay) look-up tables are generated according to the present invention. In one embodiment of the invention, the method generates a look-up table $D(r,m) = (512 \cdot \theta_m)/(2\pi k) = 512 \cdot b \cdot \Delta_m \cdot v$, where r is a vector from a microphone array to a candidate source location (see FIG. 2A), and m is the microphone index. If there are 4326 candidate source locations and 16 microphones, then the look-up table D(r,m) has 4326·16=69,216 entries. In addition, the method generates a modulo cosine table cos_table(i)=$\cos(\pi \cdot i/256)$ with 512 entries, where i=0, . . . , 511. Finally, $\cos(\theta_m)$ may be obtained for a given candidate source location and a given frequency bin number k by a formula $\cos(\theta_m)$=cos_table(0x1FF & int(k·D(r,m))). The argument int(k·D(r,m)) is a product k·D(r,m) rounded to the nearest integer, the argument 0x1FF is a hexadecimal representation of the decimal number 511, and & is a binary "and" function. For example, a binary representation of 0x1FF is the 9-bit representation 1 1 1 1 1 1 1 1 1 . If, for example, $\theta_m = \pi/2$, then int(k·D(r, m))=int((512·$\theta_m$)/2π)=128=0 1 0 0 0 0 0 0 0 in binary. Therefore, $\cos(\theta_m)$=cos_table((1 1 1 1 1 1 1 1 1) & (0 1 0 0 0 0 0 0 0))=cos$_{table}$(128)=$\cos(\pi \cdot 128/256)$=$\cos(\pi/2)$.

According to one embodiment of the present invention which comprises 4326 candidate source locations and 16 microphones, the method of generating $\cos(\theta_m)$ and $\sin(\theta_m)$ of the transcendental function $e^{i\theta}{}_m$ requires only three look-up tables: the look-up table D(r,m) with 69,216 entries, the modulo cosine table cos_table(i) with 512 entries, and a modulo sine table sin_table(i) with 512 entries, where the modulo sine table $\sin_{13}$ table(i)=$\sin(\pi \cdot i/256)$. Thus, a total number of 70,240 entries are associated with the three look-up tables, requiring approximately 140 k bytes of memory. The 140 k bytes of memory required for the three tables is more than 1000 times less than the 177 M bytes of memory required to store every value of the transcendental function.

The invention has been explained above with reference to preferred embodiments. Other embodiments will be apparent to those skilled in the art in light of this disclosure. The present invention may readily be implemented using configurations other than those described in the preferred embodiments above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A method for computing a location of an acoustic source, comprising the steps of:

receiving acoustic signals from the acoustic source by an array of M-1 microphones and a reference microphone, each microphone identified by an integer microphone index m, $0 \leq m \leq M-1$;

storing phase-delay look-up tables, the phase-delay look-up tables based upon a plurality of candidate source locations and a spatial configuration of the array of microphones; and processing the received acoustic signals using the phase-delay look-up tables to compute the location of the acoustic source.

2. The method of claim 1, wherein an entry in a first phase-delay look-up table is defined by an algebraic expression $D(r,m)=512 \cdot b \cdot \Delta m \cdot v$, where r is a vector to a candidate source location of the plurality of candidate source locations, b is a frequency width, v is inversely proportional to a speed of sound, and $\Delta m$ is a distance between a location of a microphone m and the candidate source location minus a distance between a location of the reference microphone and the candidate source location.

3. The method of claim 1, wherein an entry in a second phase-delay look-up table is defined by an algebraic expression $\cos\_table(j)=\cos(\pi \cdot j/256)$, where j is an integer index and $0 \leq j \leq 511$.

4. The method of claim 1, wherein an entry in a third phase-delay look-up table is defined by an algebraic expression $\sin\_table(j)=\sin(\pi \cdot j/256)$, where j is an integer index and $0 \leq j \leq 511$.

5. The method of claim 1, wherein the processing further comprises the steps of:

processing each received acoustic signal to generate blocks of complex coefficients sampled in frequency, each complex coefficient of a block associated with a frequency bin number k, where $0 \leq k \leq N-1$;

computing signal energies, a signal energy received by the array of microphones from a candidate source location of the plurality of candidate source locations for the frequency bin number k determined by multiplying a complex coefficient of a selected block from each received acoustic signal associated with a microphone m by an appropriate phase delay, summing the phase-delayed complex coefficients, and squaring the summation; and computing the location of the acoustic source by normalizing and summing the signal energies over the N frequency bin numbers for each candidate source location of the plurality of candidate source locations to give a total signal energy for each candidate source location.

6. The method of claim 5, wherein the processing further comprises the steps of:

digitizing each received acoustic signal;

segmenting each digitized signal into a plurality of blocks, each block of the plurality of blocks including N digital samples Xpm(n), each digital sample Xpm(n) identified by the integer microphone index m, an integer block index p, and an integer sample index n, where $0 \leq n \leq N-1$ and performing a discrete Fast Fourier Transform (FFT) on each block to transform the N digital samples per block to N complex coefficients Fpm(k) per block, where $0 \leq k \leq N-1$.

7. The method of claim 5, wherein the appropriate phase delay for the frequency bin number k, the candidate source location, and the microphone m is determined from a first phase-delay look-up table D(r,m), a second phase-delay look-up table cos_table(j), and a third phase-delay look-up table sin_table(j), where r is a vector to the candidate source location of the plurality of candidate source locations and j is an integer computed from an algebraic expression based upon the first look-up table and the frequency bin number k.

8. The method of claim 5, wherein the computing the location of the acoustic source further comprises the step of determining a maximum total signal energy.

9. A method for computing a location of an acoustic source, comprising the steps of:

receiving analog signals from M-1 microphones and a reference microphone, each received analog signal and each microphone identified by an integer microphone index m, $0 \leq m \leq M-1$;

digitizing each received analog signal to generate a plurality of digital samples;

segmenting each digitized signal into a plurality of blocks, each block of the plurality of blocks including N digital samples of the plurality of digital samples and each digital sample of the N digital samples identified by the integer microphone index m, an integer block index p, and an integer sample index n, $0 \leq n \leq N-1$;

performing a discrete Fast Fourier Transform (FFT) on each block to transform the N digital samples to N complex coefficients, a complex coefficient Fpm(k) of the N complex coefficients identified by the integer microphone index in, the integer block index p, and an integer frequency bin number k, $0 \leq k \leq N-1$;

searching P blocks of each digitized signal for a maximum signal energy associated with the integer frequency bin number k, identifying a block p' containing the maximum signal energy, $0 \leq p' \leq P-1$;

comparing the maximum signal energy with a threshold energy Et(k), and if the maximum signal energy is less than the threshold energy, setting each complex coefficient of the P blocks of each digitized signal associated with the integer frequency bin number k equal to zero;

determining a plurality of phase delays using look-up tables;

multiplying each complex coefficient by a phase delay $e^{i\theta m}$ from the plurality of phase delays to generate phase-delayed complex coefficients and summing the phase-delayed complex coefficients over the integer microphone index m for a candidate source location (x,y,z) of a plurality of candidate source locations and for the integer frequency bin number k according to a first algebraic expression $$G(x, y, z)(k) = \sum_{m=0}^{M-1} e^{i\theta m} F_{p'}^m(k);$$

computing a normalized total signal energy for the candidate source location (x,y,z) according to a second algebraic expression;

$$W(x, y, z) = \sum_{k=k1}^{k=kh} [|G(x, y, z)(k)|^2 / |S(k)|^2],$$

where $0 \leq k1 \leq kh \leq N-1$ and S(k) is an approximate measure of signal strength for the integer frequency bin number k; and determining the location of the acoustic source based upon the normalized total signal energies computed for the plurality of candidate source locations.

10. The method of claim 9, wherein M=16.

11. The method of claim 9, wherein N=640.

12. The method of claim 9, wherein P=5.

13. The method of claim 9, wherein an entry in a first look-up table is defined by an algebraic expression D(r,m)= 512·b·Δm·v, where r is a vector to the candidate source location (x,y,z) of the plurality of candidate source locations, b is a frequency width of the integer frequency bin number k, v is inversely proportional to a speed of sound, and Δm is a distance between a location of a microphone m and the candidate source location (x,y,z) minus a distance between a location of the reference microphone and the candidate source location (x,y,z).

14. The method of claim 13, wherein an integer index j is defined by a third algebraic expression j=0x1FF & int(k·D(r,m)), where int(k·D(r,m)) is a product k·D(r,m) rounded to a nearest integer, 0 x1FF is a hexadecimal representation of a decimal number 511, and & is a binary "and" function.

15. The method of claim 14, wherein the phase delay eiθm is defined by a fourth algebraic expression eiθm=cos_table(j)+i·sin_table(j), where i is (−1)1/2, cos_table(j)=cos(π·j/256), and sin_table(j)=sin(π·j/256).

16. The method of claim 9, wherein |S(k)|2 is defined by a fifth algebraic expression $$|S(k)|2 = \sum_{m=0}^{M-1} |P'm(k)|2.$$

17. The method of claim 9, wherein determining the location of the acoustic source further comprises the step of determining a maximum normalized total signal energy from the normalized total signal energies.

18. An electronic-readable medium having embodied thereon a program, the program being executable by a machine to perform method steps for computing a location of an acoustic source, the method steps comprising:

receiving acoustic signals from the acoustic source by an array of M-1 microphones and a reference microphone, each microphone identified by an integer microphone index m, 0≦m≦M-1;

storing phase-delay look-up tables, the phase-delay look-up tables based upon a plurality of candidate source locations and a spatial configuration of the array of microphones; and processing the received acoustic signals using the phase-delay look-up tables to compute the location of the acoustic source.

19. The electronic-readable medium of claim 18, further comprising the steps of:

processing each received acoustic signal to generate blocks of complex coefficients sampled in frequency, each complex coefficient of a block associated with a frequency bin number k, where 0≦k≦N-1;

computing signal energies, a signal energy received by the array of microphones from a candidate source location of the plurality of candidate source locations for the frequency bin number k determined by multiplying a complex coefficient of a selected block from each received acoustic signal associated with a microphone m by an appropriate phase delay, summing the phase-delayed complex coefficients, and squaring the summation; and computing the location of the acoustic source by normalizing and summing the signal energies over the N frequency bin numbers for each candidate source location of the plurality of candidate source locations to give a total signal energy for each candidate source location.

20. The electronic-readable medium of claim 19, wherein the appropriate phase delay for the frequency bin number k, the candidate source location, and the microphone m is determined from a first phase-delay look-up table D(r,m), a second phase-delay look-up Table cos_table(j), and a third phase-delay look-up table sin_table(j), where r is a vector to the candidate source location of the plurality of candidate source locations and j is an integer computed from an algebraic expression based upon the first look-up table and the frequency bin number k.

21. The electronic-readable medium of claim 19, wherein the computing the location of the acoustic source further comprises the step of determining a maximum total signal energy.

22. A system for computing a location of an acoustic source, comprising:

means for receiving acoustic signals from the acoustic source by an array of M-1 microphones and a reference microphone, each microphone identified by an integer microphone index m, 0≦m≦M-1;

means for storing phase-delay look-up tables, the phase-delay look-up tables based upon a plurality of candidate source locations and a spatial configuration of the array of microphones; and means for processing the received acoustic signals using the phase-delay look-up tables to compute the location of the acoustic source.

* * * * *

UNITED STATES PATENT AND TRADEMARK OFFICE
CERTIFICATE OF CORRECTION

PATENT NO. : 6,912,178 B2
DATED : June 28, 2005
INVENTOR(S) : Peter L. Chu, Michael Kenoyer and Richard Washington It is certified that error appears in the above-identified patent and that said Letters Patent is hereby corrected as shown below:

Column 11,
Line 22, the formula "$0 \leq j511$" should be changed to -- $0 \leq j \leq 511$ --.

Column 12,
Line 26, the word "in" after "microphone index" should be changed to -- m --.
Line 62, the formula "$0 \leq k1 \leq kh \leq N-1$" should be changed to -- $0 \leq k1 < kh \leq N-1$ --.

Column 14,
Line 25, the word "Table" should be changed to -- table --.
Line 31, the word "the" before "computing" should be removed.

Signed and Sealed this

Thirtieth Day of August, 2005

JON W. DUDAS
*Director of the United States Patent and Trademark Office*